US012597417B2

(12) United States Patent
Botros et al.

(10) Patent No.: US 12,597,417 B2
(45) Date of Patent: Apr. 7, 2026

(54) EXPORTING MODULAR ENCODER FEATURES FOR STREAMING AND DELIBERATION ASR

(71) Applicant: Google LLC, Mountain View, CA (US)

(72) Inventors: Rami Magdi Fahmi Botros, Mountain View, CA (US); Rohit Prakash Prabhavalkar, Palo Alto, CA (US); Johan Schalkwyk, Scarsdale, NY (US); Tara N. Sainath, Jersey City, NJ (US); Ciprian Ioan Chelba, Mountain View, CA (US); Francoise Beaufays, Mountain View, CA (US)

(73) Assignee: Google LLC, Mountain View, CA (US)

( * ) Notice: Subject to any disclaimer, the term of this patent is extended or adjusted under 35 U.S.C. 154(b) by 188 days.

(21) Appl. No.: 18/494,763

(22) Filed: Oct. 25, 2023

(65) Prior Publication Data

US 2024/0144917 A1    May 2, 2024

Related U.S. Application Data

(60) Provisional application No. 63/381,117, filed on Oct. 26, 2022.

(51) Int. Cl.
*G10L 15/16*    (2006.01)

(52) U.S. Cl.
CPC .................................... *G10L 15/16* (2013.01)

(58) Field of Classification Search
CPC ....... G10L 15/16; G10L 15/063; G10L 15/02; G10L 15/22; G10L 15/26; G10L 15/32;
(Continued)

(56) References Cited

U.S. PATENT DOCUMENTS

| | | | | |
|---|---|---|---|---|
| 8,751,239 B2 * | 6/2014 | Tian | ...................... | G10L 15/063 |
| | | | | 704/266 |
| 11,908,461 B2 * | 2/2024 | Hu | ......................... | G10L 15/063 |

(Continued)

OTHER PUBLICATIONS

International Search Report and Written Opinion for related PCT Application No. PCT/US2023/035938, dated Jan. 3, 2024.
Rami Botros et al: "Lego-Features: Exporting modular encoder features for streaming and deliberation ASR", arxiv.org, Cornell University Library, 201 Olin Library Cornell University Ithaca, NY 14853, Mar. 31, 2023 (Mar. 31, 2023), XP091473456.

(Continued)

*Primary Examiner* — Abdelali Serrou
(74) *Attorney, Agent, or Firm* — Honigman LLP; Brett A. Krueger; Grant Griffith

(57)    ABSTRACT

A method includes obtaining a base encoder from a pre-trained model, and receiving training data comprising a sequence of acoustic frames characterizing an utterance paired with a ground-truth transcription of the utterance. At each of a plurality of output steps, the method includes: generating, by the base encoder, a first encoded representation for a corresponding acoustic frame; generating, by an exporter network configured to receive a continuous sequence of first encoded representations generated by the base encoder, a second encoded representation for a corresponding acoustic frame; generating, by an exporter decoder, a probability distribution over possible logits; and determining an exporter decoder loss based on the probability distribution over possible logits generated by the exporter decoder at the corresponding output step and the ground-truth transcription. The method also includes training the exporter network based on the exporter decoder losses while parameters of the base encoder are frozen.

22 Claims, 8 Drawing Sheets

(58) Field of Classification Search
CPC ......... G10L 2015/0635; G10L 15/1815; G10L 15/00; G10L 25/30; G10L 19/167; G10L 15/083; G10L 15/005; G10L 15/01; G10L 15/065; G10L 25/18; G10L 19/16; G10L 15/30; G10L 15/183
See application file for complete search history.

(56) References Cited

U.S. PATENT DOCUMENTS

| | | | | |
|---|---|---|---|---|
| 12,002,451 | B1 * | 6/2024 | Liu | G10L 15/16 |
| 2017/0270919 | A1 * | 9/2017 | Parthasarathi | G10L 17/06 |
| 2019/0205748 | A1 * | 7/2019 | Fukuda | G10L 15/063 |
| 2020/0027444 | A1 * | 1/2020 | Prabhavalkar | G10L 15/063 |
| 2020/0335091 | A1 * | 10/2020 | Chang | G10L 15/14 |
| 2021/0225369 | A1 * | 7/2021 | Hu | G10L 15/063 |
| 2021/0375289 | A1 * | 12/2021 | Zhu | G10L 15/22 |
| 2021/0383195 | A1 | 12/2021 | Gygli et al. | |
| 2022/0351718 | A1 * | 11/2022 | Wu | G10L 15/16 |

OTHER PUBLICATIONS

Gygli Michael et al: "Towards Reusable Network Componenets by Learning Compatible Representations", Proceedings of the AAAI Conference on Artificial Intelligence, vol. 35, No. 9, Feb. 2, 2021 (Feb. 2, 2021), pp. 7620-7629, XP093111745, ISSN: 2159-5399, DOI: 10.1609/aaai.v35i9.16932.

Dalmia Siddharth et al: "LegoNN: Building Modular Encoder-Decoder Models", IEEE/ACM Transactions on Audio, Speech, and Language Processing, [Online] vol. 31, Jan. 1, 2023 (Jan. 1, 2023), pp. 3112-3126, XP093111303, ISSN: 2329-9290, DOI:10.1109/TASLP.2023.3296019.

Hu Ke et al: "Transformer Based Deliberation for Two-Pass Speech Recognition", 2021 IEEE Spoken Language Technology Workship (SLT), [Online] Jan. 19, 2021 (Jan. 19, 2021), pp. 68-74, XP093000484, DOI: 10.1109/SLT48900.2021.9383497, ISBN: 978-1-7281-7066-4.

* cited by examiner

200

Acoustic Frames — 162

Base Encoder 210 — 212

Exporter Network 220 — 222

Exporter Decoder 230 — 232

Extractor Network 240 — 202

Modular Encoded Representation

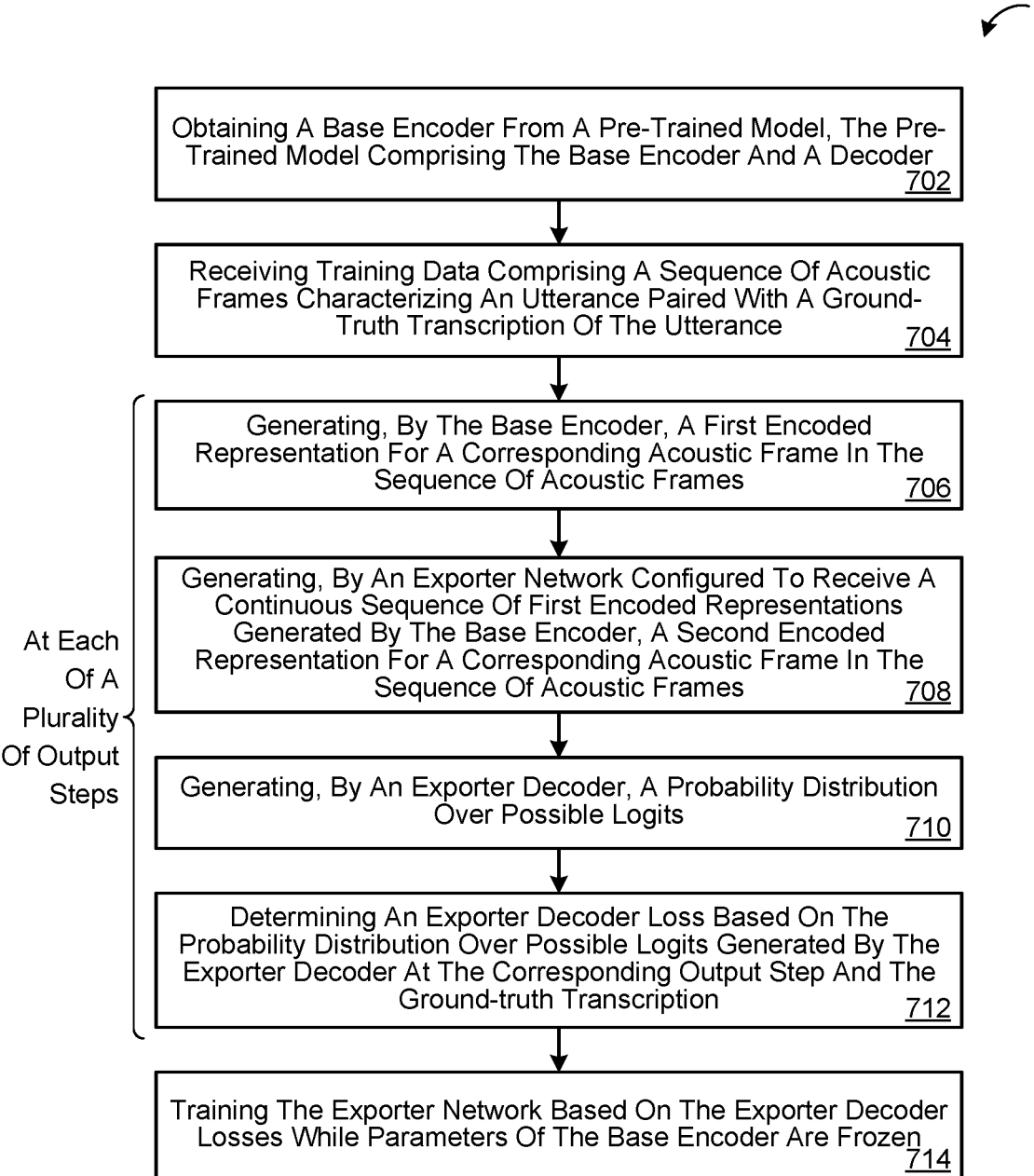

700

Obtaining A Base Encoder From A Pre-Trained Model, The Pre-Trained Model Comprising The Base Encoder And A Decoder
702

Receiving Training Data Comprising A Sequence Of Acoustic Frames Characterizing An Utterance Paired With A Ground-Truth Transcription Of The Utterance
704

At Each Of A Plurality Of Output Steps

Generating, By The Base Encoder, A First Encoded Representation For A Corresponding Acoustic Frame In The Sequence Of Acoustic Frames
706

Generating, By An Exporter Network Configured To Receive A Continuous Sequence Of First Encoded Representations Generated By The Base Encoder, A Second Encoded Representation For A Corresponding Acoustic Frame In The Sequence Of Acoustic Frames
708

Generating, By An Exporter Decoder, A Probability Distribution Over Possible Logits
710

Determining An Exporter Decoder Loss Based On The Probability Distribution Over Possible Logits Generated By The Exporter Decoder At The Corresponding Output Step And The Ground-truth Transcription
712

Training The Exporter Network Based On The Exporter Decoder Losses While Parameters Of The Base Encoder Are Frozen
714

FIG. 7

EXPORTING MODULAR ENCODER FEATURES FOR STREAMING AND DELIBERATION ASR

CROSS REFERENCE TO RELATED APPLICATIONS

This U.S. patent application claims priority under 35 U.S.C. § 119(e) to U.S. Provisional Patent Application No. 63/381,117, filed on Oct. 26, 2022. The disclosure of this prior application is considered part of the disclosure of this application and is hereby incorporated by reference in its entirety.

TECHNICAL FIELD

This disclosure relates to streaming and deliberation automatic speech recognition (ASR).

BACKGROUND

Speech recognition systems are increasingly used to transcribe speech to text in many daily applications. These speech recognition systems may be embedded on user devices such as smart home devices or smartphones, or used in cloud-related services.

SUMMARY

One aspect of the disclosure provides a computer-implemented method for exporting modular encoder features for streaming and deliberation automatic speech recognition (ASR). The method, when executed by data processing hardware, causes the data processing hardware to perform operations. The operations include obtaining a base encoder from a pre-trained model, the pre-trained model including the base encoder and a decoder, and receiving training data including a sequence of acoustic frames characterizing an utterance paired with a ground-truth transcription of the utterance. At each of a plurality of output steps, the operations include: generating, by the base encoder, a first encoded representation for a corresponding acoustic frame in the sequence of acoustic frames; generating, by an exporter network configured to receive a continuous sequence of first encoded representations generated by the base encoder, a second encoded representation for a corresponding acoustic frame in the sequence of acoustic frames; generating, by an exporter decoder, a probability distribution over possible logits; and determining an exporter decoder loss based on the probability distribution over possible logits generated by the exporter decoder at the corresponding output step and the ground-truth transcription. The operations also include training the exporter network based on the exporter decoder losses while parameters of the base encoder are frozen.

Implementations of the computer-implemented method or the system of the disclosure may include one or more of the following optional features. In some implementations, the operations also include obtaining the base encoder from a pre-trained streaming recognition model that includes the base encoder, a prediction network, and a joint network. In some examples, the base encoder includes a first plurality of multi-head self-attention blocks, and the exporter network includes a second plurality of multi-head self-attention blocks. The second plurality of multi-head self-attention blocks of the exporter network may be non-causal. Alternatively, the first plurality of multi-head self-attention blocks of the base encoder and the second plurality of multi-head self-attention blocks of the exporter network include conformer blocks.

In some examples, the exporter decoder includes a connectionist temporal classification (CTC) decoder, the exporter decoder loss includes a CTC loss, and the logits include sub-word units. The sub-word units may be wordpieces, graphemes, phonemes, or triphones. In some implementations, the operations also include, at each of the plurality of output steps: determining a modular encoded representation for a corresponding acoustic frame in the sequence of acoustic frames by extracting a top-k indices of logits from the probability distribution over possible logits generated by the exporter decoder at the corresponding output step; re-embedding the modular encoded representation determined at the corresponding output step; generating, by an importer network, an importer representation for a corresponding re-embedded modular encoded representation; and generating, by a speech decoder, a speech recognition hypothesis for a corresponding importer representation. The speech decoder may be a recurrent neural network-transducer (RNN-T) decoder. Alternatively, the speech decoder may be a listen-attend-spell (LAS) decoder. Here, the exporter decoder may be a recurrent neural network-transducer (RNN-T) decoder.

Another aspect of the disclosure provides a system including data processing hardware and memory hardware in communication with data processing hardware. The memory hardware stores instructions that, when executed on the data processing, hardware causes the data processing hardware to perform operations. The operations include obtaining a base encoder from a pre-trained model, the pre-trained model including the base encoder and a decoder, and receiving training data including a sequence of acoustic frames characterizing an utterance paired with a ground-truth transcription of the utterance. At each of a plurality of output steps, the operations include: generating, by the base encoder, a first encoded representation for a corresponding acoustic frame in the sequence of acoustic frames; generating, by an exporter network configured to receive a continuous sequence of first encoded representations generated by the base encoder, a second encoded representation for a corresponding acoustic frame in the sequence of acoustic frames; generating, by an exporter decoder, a probability distribution over possible logits; and determining an exporter decoder loss based on the probability distribution over possible logits generated by the exporter decoder at the corresponding output step and the ground-truth transcription. The operations also include training the exporter network based on the exporter decoder losses while parameters of the base encoder are frozen.

Implementations of the computer-implemented method or the system of the disclosure may include one or more of the following optional features. In some implementations, the operations also include obtaining the base encoder from a pre-trained streaming recognition model that includes the base encoder, a prediction network, and a joint network. In some examples, the base encoder includes a first plurality of multi-head self-attention blocks, and the exporter network includes a second plurality of multi-head self-attention blocks. The second plurality of multi-head self-attention blocks of the exporter network may be non-causal. Alternatively, the first plurality of multi-head self-attention blocks of the base encoder and the second plurality of multi-head self-attention blocks of the exporter network include conformer blocks.

In some examples, the exporter decoder includes a connectionist temporal classification (CTC) decoder, the exporter decoder loss includes a CTC loss, and the logits include sub-word units. The sub-word units may be word-pieces, graphemes, phonemes, or triphones. In some implementations, the operations also include, at each of the plurality of output steps: determining a modular encoded representation for a corresponding acoustic frame in the sequence of acoustic frames by extracting a top-k indices of logits from the probability distribution over possible logits generated by the exporter decoder at the corresponding output step; re-embedding the modular encoded representation determined at the corresponding output step; generating, by an importer network, an importer representation for a corresponding re-embedded modular encoded representation; and generating, by a speech decoder, a speech recognition hypothesis for a corresponding importer representation. The speech decoder may be a recurrent neural network-transducer (RNN-T) decoder. Alternatively, the speech decoder may be a listen-attend-spell (LAS) decoder. Here, the exporter decoder may be a recurrent neural network-transducer (RNN-T) decoder.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 7 is a flow chart of an example arrangement of operations for a method of training a modular feature encoder model.

Like reference symbols in the various drawings indicate like elements.

DETAILED DESCRIPTION

End-to-end (E2E) speech recognition models, which combine acoustic, pronunciation, and language models into one neural network, have become widely used, especially for on-device applications. Because E2E speech recognition models are much smaller than conventional models, and their inference speed is often much faster, they work well for various streaming applications. E2E speech recognition models typically use an encoder-decoder architecture. Here, the encoder of an E2E speech recognition model implicitly learns to serve the particular decoder of the E2E speech recognition model and, conversely, the decoder is thoroughly oriented towards inputs coming from the encoder that it has been trained with. Thus, encoders and decoders across different models are not interchangeable without further E2E training. This tight coupling between the encoder and decoder stands in the way of a flexible, modular architecture. Speech encoders that have been trained on a large quantity of training utterances may serve as a base model for other tasks like sentiment analysis or low-resource translation, to name a few. Thus, in cases where a shared encoder is serving multiple downstream decoders, it would be more practical if the encoders and decoders could be developed and updated independently. Therefore, there is a need for modular speech encoder models that can generate modular encoded representations that can be processed by different downstream decoders. The modular speech encoder model generates the modular encoded representations from encoded representations generated by a pre-trained encoder of the modular speech encoder model. Here, modularity refers a characteristic of the modular encoded representation that allows the modular encoded representation to be processed or decoded by different downstream decoders without the downstream decoders having to be trained together with the pre-trained encoder of the modular speech encoder model. That is, the pre-trained encoder of the modular speech encoder model may be interchangeable with the encoders with which the downstream decoders were trained. In this way, the modular speech encoder model and the modular encoded representations becomes modular and work with different downstream decoders, and enable the developer of an encoder to export encoded representations without having to modify the encoder to work with each downstream decoder.

Figure 1:
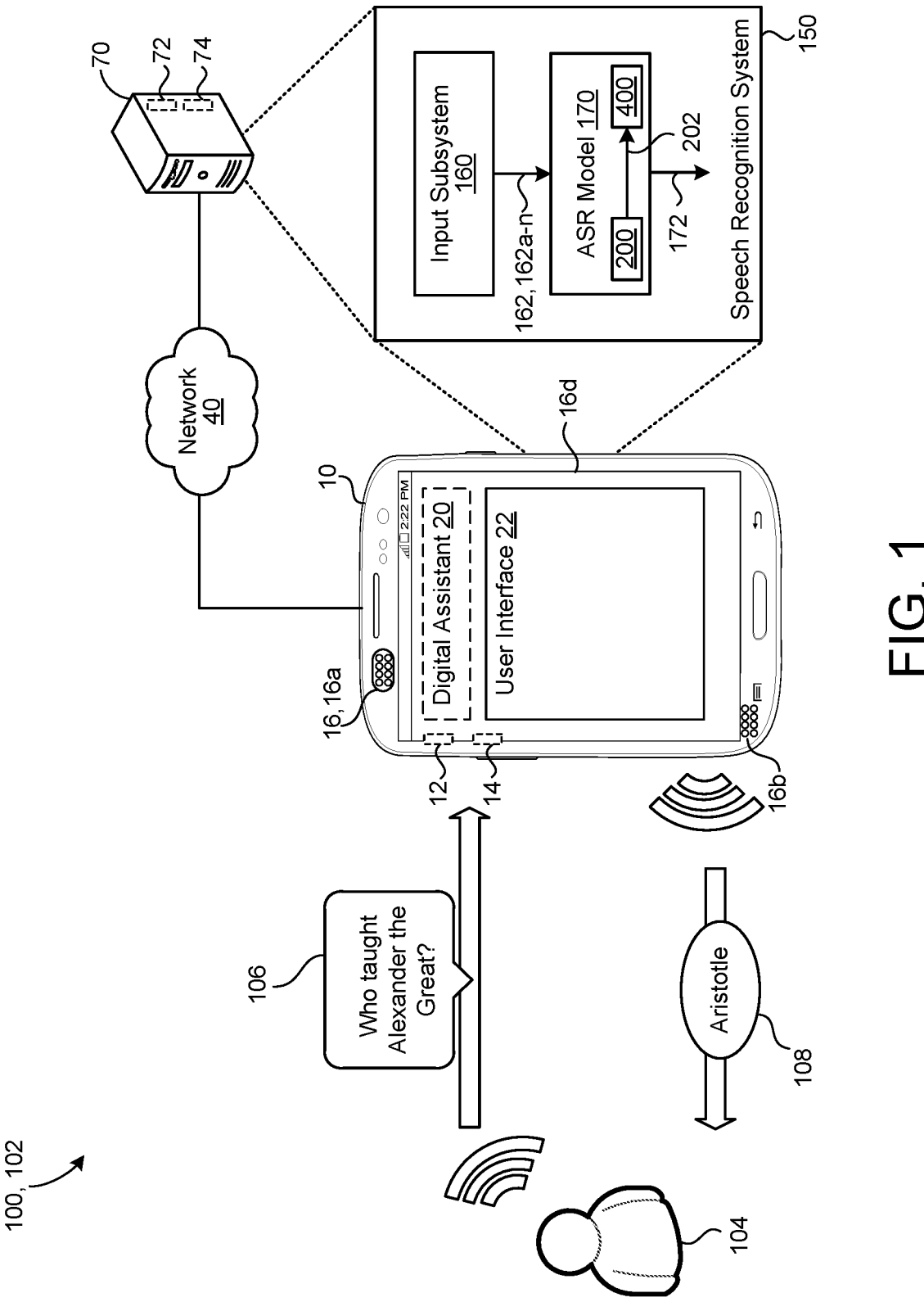
FIG. 1 is a schematic view of an example speech environment using a speech recognition system for transcribing utterances.

Referring to FIG. 1, in some implementations, a speech environment 100 includes a user 104 using spoken utterances 106 to interact with a voice-enabled device (also referred to as a user device 10). Here, a spoken utterance 106 corresponds to, for example, a dictation for transcription, or a query to solicit a response from the user device or to have the user device 10 execute a task specified by the query. In this sense, the user 104 may have conversational-like interactions with the user device 10 to perform computing activities or find answers to questions. In the example shown, a system 102 includes an automatic speech recognition (ASR) model 170 of a speech recognition system 150 for generating a transcription 172 of the utterance 106. The transcription 172 may then processed by a digital assistant 20 to generate a response to the utterance 106 or execute a task specified by the utterance 106. In some implementations, the digital assistant 20 includes a natural language processing/understanding (NLP/NLU) module executing on the user device 10 or a remote computing system 70 for processing the transcription 172 to understand the utterance 106. The digital assistant 20 may provide a response as text in a user interface 22 on a display 16c of the user device 10 or as audio signals 108 output by a speaker 16b of the user device 10. In some examples, the digital assistant 20 generates text representing a response, and a text-to-speech (TTS) system (not shown) converts the text to audio signals 108 as synthetic speech. In the example shown, the user 104 speaks an utterance 106 asking "Who taught Alexander the Great," and the digital assistant 20 responds with audio data 108 representing a response of "Aristotle."

The user device 10 may correspond to any computing device associated with a user 104 and capable of capturing a sequence of acoustic frames 162, 162a—n characterizing an utterance 106 and providing, in response, textual or audible outputs. Some examples of user devices 10 include, but are not limited to, mobile devices (e.g., mobile phones, tablets, laptops, etc.), computers, wearable devices (e.g., a smart watch, smart glasses, smart goggles, an augmented reality (AR) headset, a virtual reality (VR) headset, etc.), smart appliances, Internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes, or is in communication with, one or more input/output devices 16, 16a—c, such as an audio capture device 16, 16a (e.g., an array of one or more microphones) for capturing and converting spoken utterances 106 into electrical signals, an audio output device 16, 16b (e.g., a speaker) for communicating an audible audio signal (e.g., as output audio data from the user device 10), and the display 16, 16c for displaying the visual content. Of course, any number and/or type(s) of other input/output devices 16 may be used. The input/output devices 16 may reside on or be in communication with the user device 10.

The speech recognition system 150 executes on the user device 10 of the user 104 and/or on a remote computing system 70 (e.g., one or more remote servers of a distributed system executing in a cloud-computing environment) in communication with the user device 10 via a network 40. The speech recognition system 150 includes an input subsystem 160 configured to receive the utterances 106 spoken by the user 104 and captured by the audio capture device 16a, and convert each utterance 106 into a corresponding digital format associated with an input sequence of acoustic frames 162 (also generally referred to as audio data 162) capable of being processed by the speech recognition system 150. Thereafter, the ASR model 170 receives, as input, the sequence of acoustic frames 162 corresponding to the utterance 106, and generates/predicts, as output, a corresponding transcription 172 (e.g., recognition result/hypothesis) of the utterance 106. Here, the ASR model 170 includes a modular feature encoder model 200 for generating, based on the sequence of acoustic frames 162, a modular encoded representation 202. The ASR model 170 also includes a downstream decoder model 400 for generating, based on the modular encoded representation 202, a transcription 172 of the utterance 106. Notably, a base encoder 210 of the modular feature encoder model 200 may be trained with a decoder (e.g., a recurrent neural network-transducer (RNN-T) decoder) that is different from a speech decoder 430 (e.g., a listen-attend-spell (LAS) decoder) of the downstream decoder model 400 (see FIG. 4).

The remote computing system 70 includes data processing hardware 72, and memory hardware 74 in communication with the data processing hardware 72. The memory hardware 74 stores instructions that, when executed by the data processing hardware 72, cause the data processing hardware 72 to perform one or more operations, such as those disclosed herein.

Figure 2:
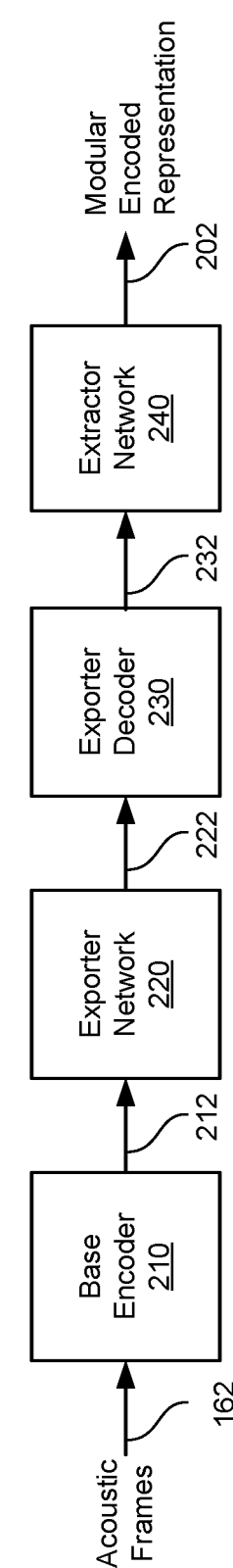
FIG. 2 is a schematic view of an example modular feature encoder model for generating modular encoded representations.

FIG. 2 is a schematic view of an example modular feature encoder model 200. The modular feature encoder model 200 receives and processes a sequence of acoustic frames 162 characterizing an utterance 106. In some implementations, the acoustic frames 162 include 128-dimensional log-Mel features that are front ended with an appended 16-dimensional one-hot domain-id vector.

The modular feature encoder model 200 includes a base encoder 210 for generating, at each of a plurality of output steps, a first encoded representation 212 for a corresponding acoustic frame 162 in the sequence of acoustic frames 162. The encoded representations 212 generated by the base encoder 210 at the plurality of output steps form a continuous sequence of encoded representations 212. Here, the base encoder 210 may be a pre-trained encoder that was trained as part of an E2E speech recognition model that includes the base encoder 210 and a decoder. Notably, the decoder of the trained E2E speech recognition model may be different from an exporter decoder 230 of the modular feature encoder model 200, and may be different from a speech decoder 430 of a downstream decoder model 400 (see FIG. 4). For example, the base encoder 210 may be the trained encoder of a trained streaming recognition model, such as an RNN-T based speech recognition model that includes the base encoder 210, a prediction network, and a joint network trained E2E using an RNN-T loss. Notably, training of the modular feature encoder model 200 does not, or does not need to, adjust coefficients of the base encoder 210, and the modular feature encoder model 200 does not include the decoder that was used to train the base encoder 210. That is, coefficients of the base encoder 210 may be frozen or held fixed during training of the modular feature encoder model 200. Notably, this allows the modular feature encoder model 200 to reuse an existing pre-trained base encoder 210 without change, while being able to export modular encoded representations 202 that may be used with, or processed by, different downstream decoder models 400. An example base encoder 210 includes 3 convolution layers, 4 causal Conformer blocks, and 10 other Conformer blocks that each process 180 milliseconds of right-context audio data. However, the base encoder 210 may implement other types of architectures that implement multi-head self-attention blocks. Alternatively, the base encoder 210 includes 12 Conformer blocks with a loopback of 23 acoustic frames, plus 5 additional non-causal blocks that each process 180 milliseconds of future audio. Here, the Conformer blocks may have a dimension of 512, and use 8-headed self-attention and a convolution kernel size of 15.

The modular feature encoder model 200 also includes an exporter network 220 for generating, at each of the plurality of output steps, based on the continuous sequence of encoded representations 212, a second different encoded representation 222 for a corresponding acoustic frame 162 in the sequence of acoustic frames 162. An example exporter network 220 includes a plurality of non-causal Conformer blocks (e.g., 5) with 180 milliseconds of look-ahead context.

The modular feature encoder model 200 also includes an exporter decoder 230 for generating, at each of the plurality of output steps, a probability distribution 232 over possible logits. An example exporter decoder 230 includes a connectionist temporal classification (CTC) decoder that includes a single projection layer that generates frame-level posterior probabilities over an output vocabulary of the exporter decoder 230. The logits may be, for example, sub-word units, such as wordpieces, phonemes, triphones, or graphemes.

The modular feature encoder model 200 also includes an extractor network 240 for extracting, at each of the plurality of output steps, as the modular encoded representation 202, the sorted top-k indices of the logits from the probability distribution 232 over possible logits (e.g., CTC logits) generated by the exporter decoder 230 at the corresponding output step. Notably, the logits are sparse (as opposed to dense embeddings), represent a discrete space (e.g., a wordpiece vocabulary), and are grounded in text and, thus, tend to be modular. Here, the first encoded representation 212 goes through a tight bottleneck formed by the exporter network 220 and the exporter decoder 230, which prevents a downstream decoder model 400 from coupling to fine details in the encoded representations 212, thereby enforcing a loose coupling between the base encoder 210 and the downstream decoder model 400. However, the modular encoded representations 202 provide an encoded representation that is sufficient for a downstream decoder model 400 to perform accurate speech recognition for the acoustic frames 162. Notably, this enables separate training and updating of the base encoder 210 and the downstream decoder model 400. Here, extracting the sorted top-k indices may be performed on logit vectors directly without needing to perform any decoding (e.g., without performing a beam search or auto-regressive computations). However, in some examples, the modular feature encoder model 200 performs speech recognition. For example, when the exporter decoder 230 includes a CTC decoder, a full set of logits generated by the CTC decoder may be decoded using a beam search or greedy decoding. Alternatively, when the exporter decoder 230 includes an RNN-T decoder, the exporter decoder 230 may be used to generate a first-pass speech recognition prediction (see FIG. 6).

Figure 3:
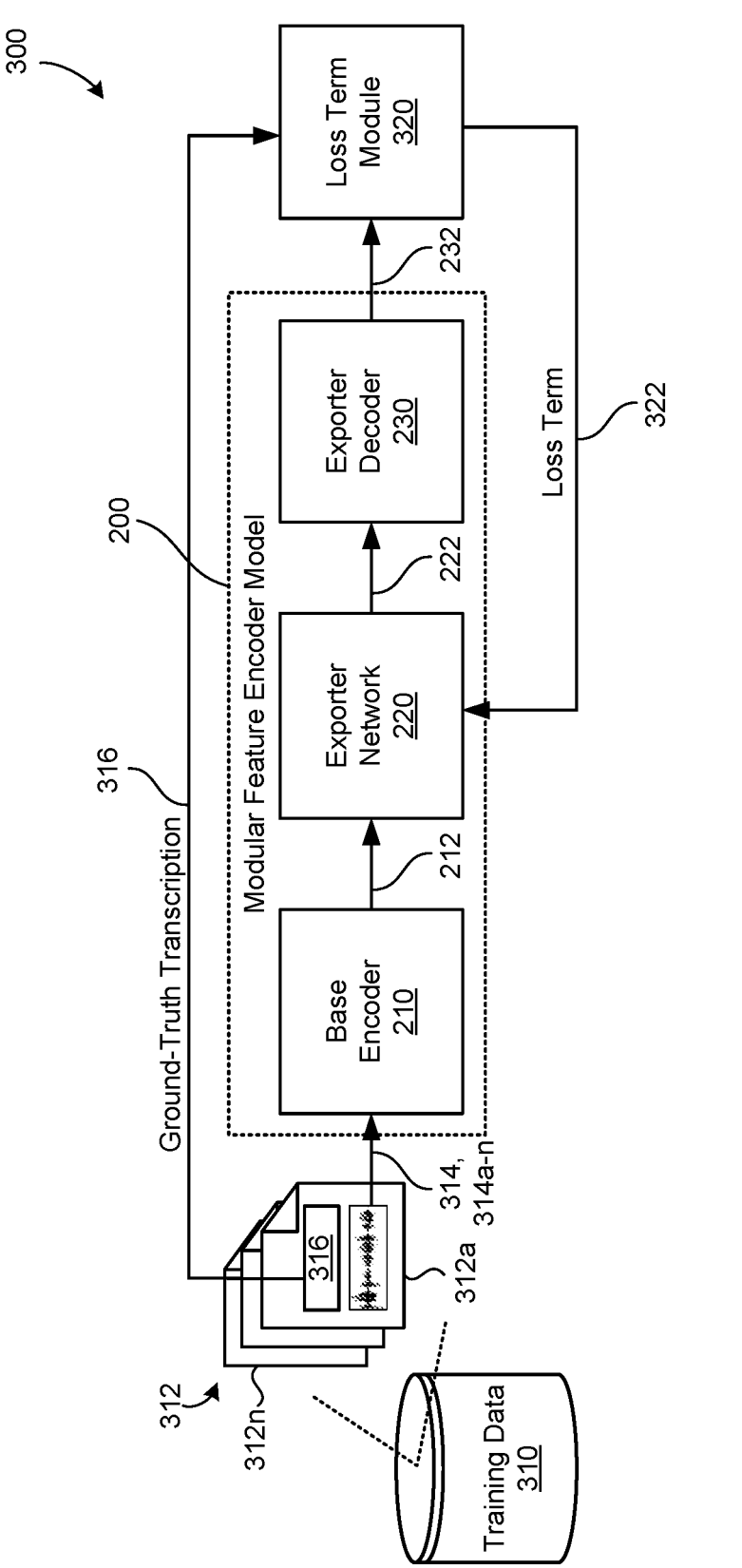
FIG. 3 is a schematic view of an example training process for training a modular feature encoder model.

FIG. 3 depicts an example training process 300 for training the modular feature encoder model 200. The training process 300 uses training data 310 that includes a plurality of training utterances 312, 312a-n. Each training utterance 312 includes a corresponding sequence of acoustic frames 314, 314a-n characterizing the training utterance 312 paired with a corresponding ground-truth transcription 316 of the training utterance 312. For each training utterance 312, the training process 300 receives the corresponding sequence of acoustic frames 314 and the corresponding ground-truth transcription 316. Thereafter, at each of a plurality of output steps for the training utterance 312, the training processing 300 generates, using the base encoder 210, a first encoded representation 212 for a corresponding acoustic frame 314 in the sequence of acoustic frames 314; generates, using the exporter network 220, a second encoded representation 222 for a corresponding acoustic frame 314 in the sequence of acoustic frames 314; and generates, using the exporter decoder 230, a probability distribution 232 over possible logits.

At each of the plurality of output steps, the training process 300 also determines, using a loss term module 320, an exporter decoder loss 322 based on the probability distribution 232 over possible logits generated by the exporter decoder 230 at the corresponding output step and the ground-truth transcription 316. In some examples, the exporter decoder 230 includes a CTC decoder, and the exporter decoder losses 322 include CTC losses. The training process 300 trains the exporter network 220 based on the exporter decoder losses 322. Notably, parameters of the base encoder 210 and the exporter decoder 230 may be held fixed or frozen while the training process trains the exporter network 220.

Figure 4:
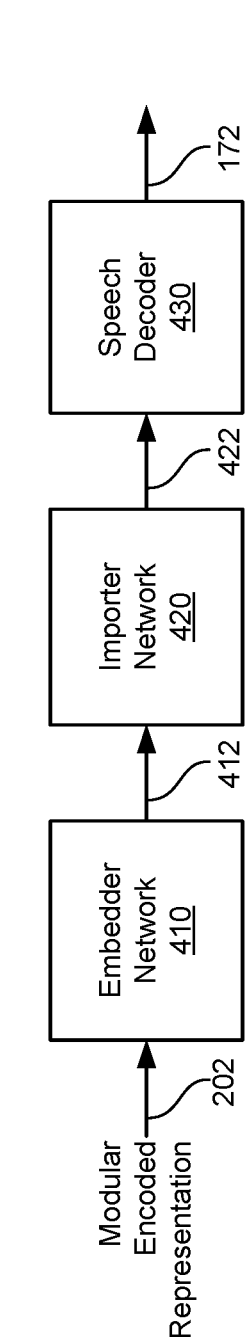
FIG. 4 is a schematic view of an example downstream decoder model for decoding modular encoded representations.

FIG. 4 is a schematic view of an example downstream decoder model 400. The downstream decoder model 400 includes an embedder network 410, an importer network 420, and a speech decoder 430. The downstream decoder model 400 receives a modular encoded representation 202 representing an utterance 106. Because the modular encoded representation 202 is, or may be, sparse, the embedder network 410 is capable of re-embedding the modular encoded representation 202 as a re-embedded modular encoded representation 412.

The importer network 420 generates, at each of the plurality of output steps, an importer representation 422 for a corresponding re-embedded modular encoded representation 412. An example importer network 420 includes a plurality of Conformer blocks with 180 milliseconds of look-ahead context. Alternatively, the importer network 420 includes one-dimensional convolution and multi-headed attention.

Thereafter, the speech decoder 430 generates a speech recognition hypothesis 172 for each corresponding importer representation 422. Example speech decoders 430 include, but are not limited to, an LAS decoder and an RNN-T decoder.

Figure 5:
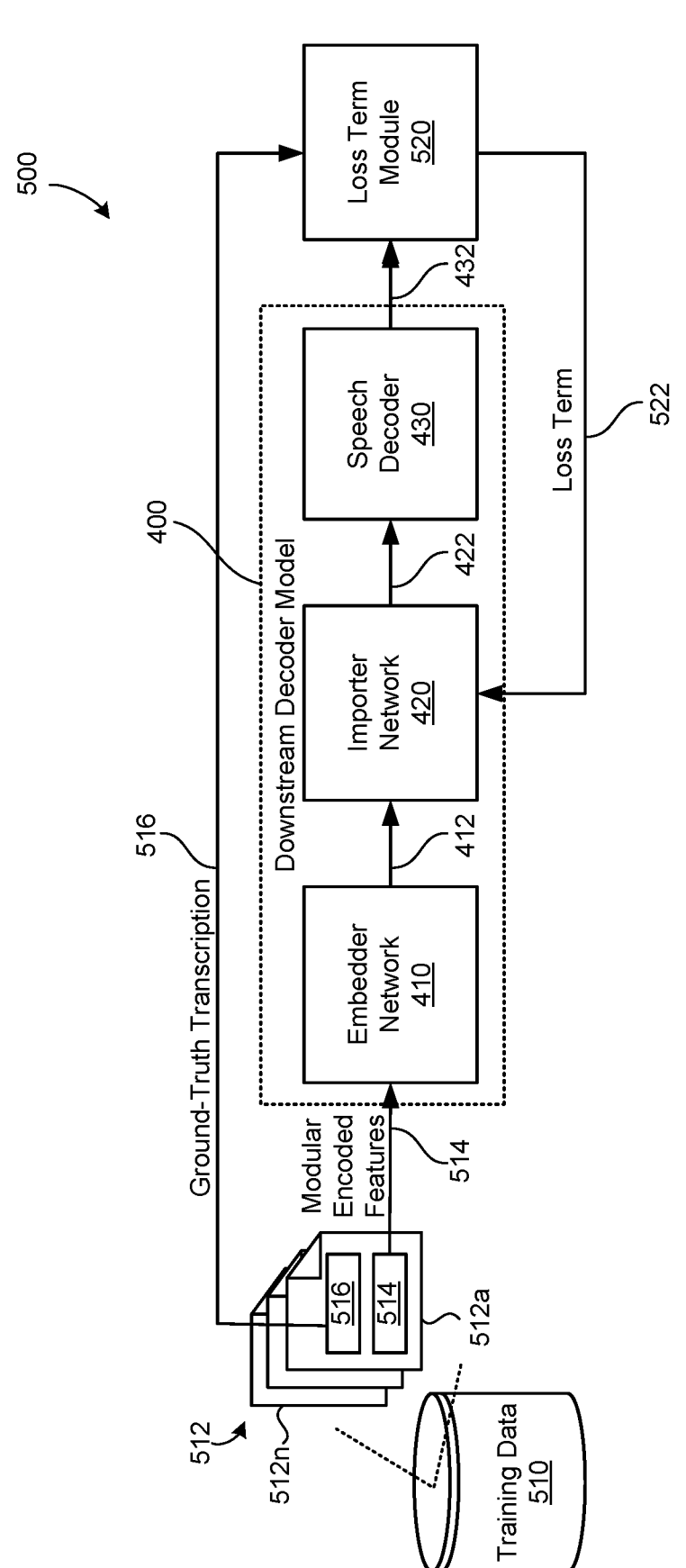
FIG. 5 is a schematic view of an example training process for training a downstream decoder model.

FIG. 5 depicts an example training process 500 for training the downstream decoder model 400. The training process 500 uses training data 510 that includes a plurality of training utterances 512, 512a-n. Each training utterance 512 includes a modular encoded representation 514 characterizing the training utterance 512 paired with a corresponding ground-truth transcription 516 of the training utterance 512. For each training utterance 512, the training process 500 receives the corresponding modular encoded representation 514 and the corresponding ground-truth transcription 516. Thereafter, at each of a plurality of output steps for the training utterance 512, the training processing 500 generates, using the embedder network 410, a re-embedded modular encoded representation 412; generates, using the importer network 420, an importer representation 422 for a corresponding re-embedded modular encoded representation 412; and generates, using the speech decoder 430, a speech recognition transcription 172 for the corresponding importer representation 422.

For each training utterance 512, the training process 500 determines, using a loss term module 520, a speech decoder loss 522 based on the speech recognition transcription 172 and the corresponding ground-truth transcription 516. In some examples, the speech decoder 430 includes a streaming RNN-T decoder, and the speech decoder loss 522 includes an RNN-T loss. Alternatively, the speech decoder 430 includes an LAS decoder that attends to all of the acoustic frames 162, and the speech decoder loss 522 includes an LAS loss.

Figure 6:
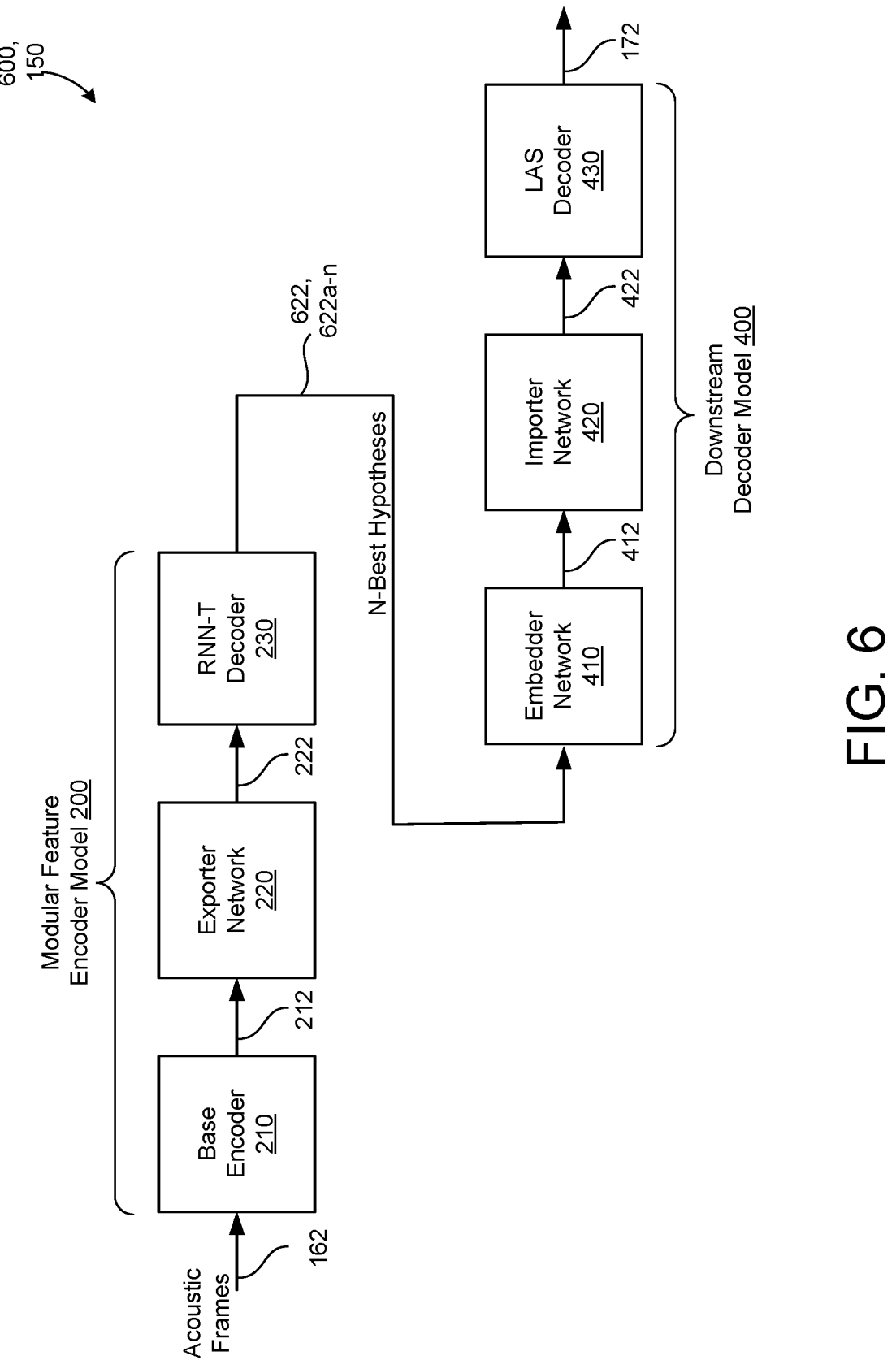
FIG. 6 is a schematic view of an example modularized two-pass deliberation speech recognition model.

FIG. 6 is a schematic view 600 of an example two-pass deliberation speech recognition model 150. The two-pass deliberation speech recognition model 150 may be constructed using the modular feature encoder model 200 with a fast, streaming RNN-T decoder as the exporter decoder 230, and a downstream decoder model 400 with a full-context LAS decoder as the speech recognition decoder 430. During inference when implemented into the two-pass deliberation architecture, the modular feature encoder model 200 does not require the extractor network 240. Here, the two-pass deliberation speech recognition model 150 generates first-pass speech recognition hypotheses 622 using the RNN-T decoder 230, embeds the n-best hypotheses 622, 622a-n from the RNN-T decoder 230, and attends to them with the second-pass full-context LAS decoder 430. In some implementations, the LAS decoder 430 attends to the continuous encoder features 212. Here, the LAS gradients may be prevented from flowing back through the embedded n-best hypotheses 622. The modular feature encoder model 200 may be trained using the training process 300 using RNN-T losses, and the downstream decoder model 400 may be trained using the training process 500 using LAS losses.

FIG. 7 is a flowchart of an exemplary arrangement of operations for a computer-implemented method 700 of training the modular feature encoder model 200. The operations may be performed by data processing hardware 810 (FIG. 8) (e.g., the data processing hardware 12 of the user device 10 or the data processing hardware 72 of the remote computing system 70) based on executing instructions stored on memory hardware 820 (e.g., the memory hardware 14 of the user device 10 or the memory hardware 74 of the remote computing system 70).

At operation 702, the method 700 includes obtaining a base encoder 210 from a pre-trained model, the pre-trained model including the base encoder 210 and a decoder. At operation 704, the method 700 includes receiving training data 310 that includes a sequence of acoustic frames 314 characterizing an utterance paired with a corresponding ground-truth transcription 316 of the utterance.

At each of a plurality of output steps for the training utterance 312, the method also includes: at operation 706 generating, using the base encoder 210, a first encoded representation 212 for a corresponding acoustic frame 314 in the sequence of acoustic frames 314; generating, using the exporter network 220 at operation 708, a second encoded representation 222 for a corresponding acoustic frame 314 in the sequence of acoustic frames 314; generating, using the exporter decoder 230, a probability distribution 232 over possible logits at operation 710; and determining, using a loss term module 320, an exporter decoder loss 322 based on the probability distribution 232 over possible logits generated by the exporter decoder 230 at the corresponding output step and the ground-truth transcription 316 at operation 712. At operation 714, the method 700 includes training the exporter network 220 based on the exporter decoder losses 322.

Figure 8:
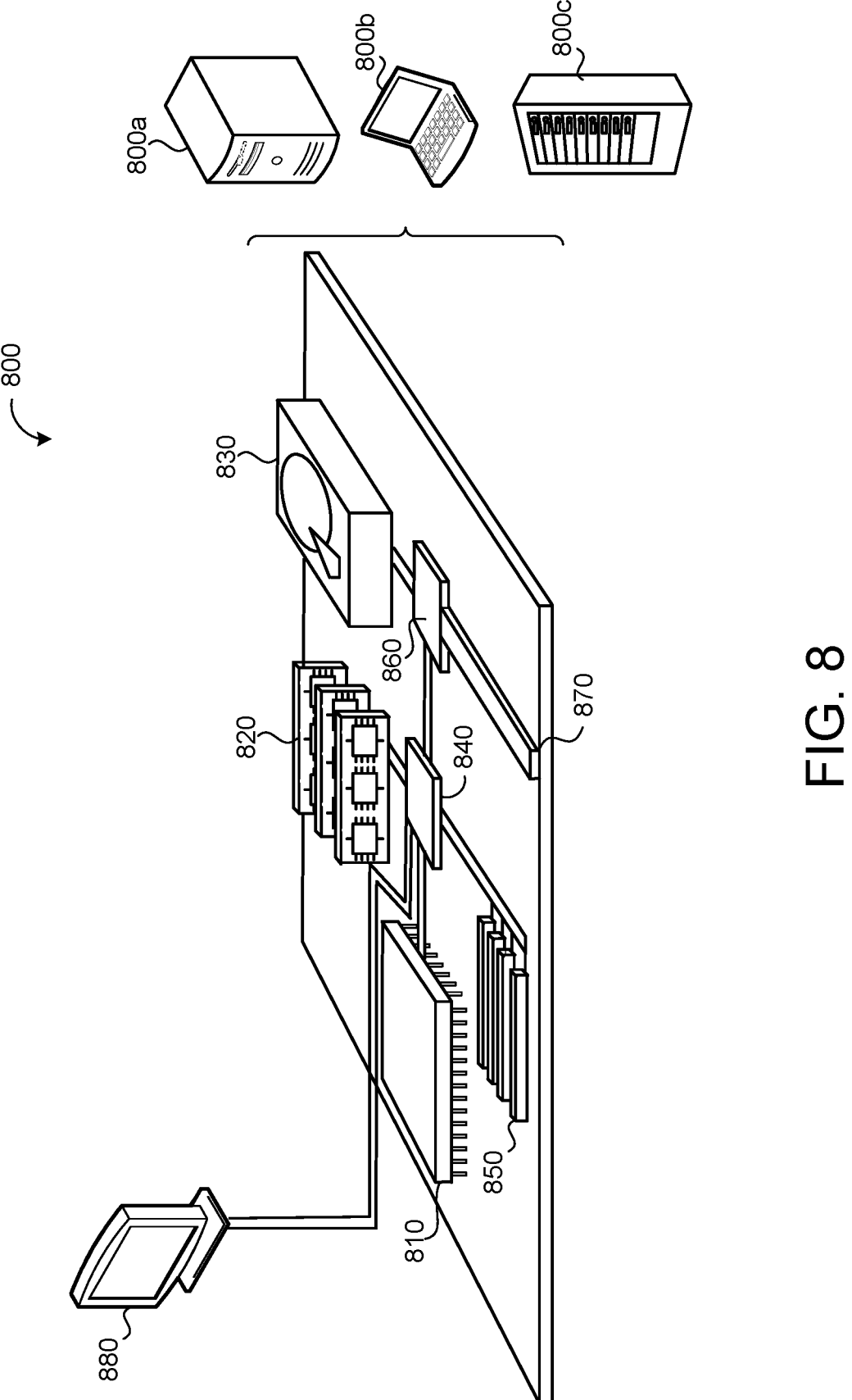
FIG. 8 is a schematic view of an example computing device that may be used to implement the systems and methods described herein.

FIG. 8 is schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document. The computing device 800 includes a processor 810 (i.e., data processing hardware) that can be used to implement the data processing hardware 12 and/or 72, memory 820 (i.e., memory hardware) that can be used to implement the memory hardware 14 and/or 74, a storage device 830 (i.e., memory hardware) that can be used to implement the memory hardware 14 and/or 74, a high-speed interface/controller 840 connecting to the memory 820 and high-speed expansion ports 850, and a low speed interface/controller 860 connecting to a low speed bus 870 and a storage device 830 that can be used to store the training data 310, 510. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800*a* or multiple times in a group of such servers 800*a*, as a laptop computer 800*b*, or as part of a rack server system 800*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
   obtaining a base encoder from a pre-trained model, the pre-trained model comprising the base encoder and a decoder;
   receiving training data comprising a sequence of acoustic frames characterizing an utterance paired with a ground-truth transcription of the utterance;
   at each corresponding output step of a plurality of output steps:
      generating, by the base encoder, a first encoded representation for a corresponding acoustic frame in the sequence of acoustic frames;
      generating, by an exporter network configured to receive a continuous sequence of first encoded representations generated by the base encoder, a second encoded representation for a corresponding acoustic frame in the sequence of acoustic frames;
      generating, by an exporter decoder, a probability distribution over possible logits; and
      determining a corresponding exporter decoder loss based on the ground-truth transcription and the probability distribution over possible logits generated by the exporter decoder at the corresponding output step; and
   training the exporter network based on the corresponding exporter decoder loss determined at each corresponding output step of the plurality of output steps while parameters of the base encoder are frozen.

2. The method of claim 1, wherein the operations further comprise obtaining the base encoder from a pre-trained streaming recognition model that comprises the base encoder, a prediction network, and a joint network.

3. The method of claim 1, wherein:
   the base encoder comprises a first plurality of multi-head self-attention blocks; and the exporter network comprises a second plurality of multi-head self-attention blocks.

4. The method of claim 3, wherein the second plurality of multi-head self-attention blocks of the exporter network are non-causal.

5. The method of claim 3, wherein the first plurality of multi-head self-attention blocks of the base encoder and the second plurality of multi-head self-attention blocks of the exporter network comprise conformer blocks.

6. The method of claim 1, wherein:

the exporter decoder comprises a connectionist temporal classification (CTC) decoder;

the corresponding exporter decoder loss comprises a CTC loss; and the logits comprise sub-word units.

7. The method of claim 6, wherein the sub-word units comprise wordpieces, graphemes, phonemes, or triphones.

8. The method of claim 1, wherein the operations further comprise, at each corresponding output step of the plurality of output steps:

determining a modular encoded representation for a corresponding acoustic frame in the sequence of acoustic frames by extracting a top-k indices of logits from the probability distribution over possible logits generated by the exporter decoder at the corresponding output step;

re-embedding the modular encoded representation determined at the corresponding output step;

generating, by an importer network, an importer representation for a corresponding re-embedded modular encoded representation; and generating, by a speech decoder, a speech recognition hypothesis for a corresponding importer representation.

9. The method of claim 8, wherein the speech decoder comprises a recurrent neural network-transducer (RNN-T) decoder.

10. The method of claim 8, wherein the speech decoder comprises a listen-attend-spell (LAS) decoder.

11. The method of claim 10, wherein the exporter decoder comprises a recurrent neural network-transducer (RNN-T) decoder.

12. A system comprising:

data processing hardware; and memory hardware in communication with the data processing hardware, the memory hardware storing instructions that, when executed on the data processing hardware, cause the data processing hardware to perform operations, the operations comprising:

obtaining a base encoder from a pre-trained model, the pre-trained model comprising the base encoder and a decoder;

receiving training data comprising a sequence of acoustic frames characterizing an utterance paired with a ground-truth transcription of the utterance;

at each corresponding output step of a plurality of output steps:

generating, by the base encoder, a first encoded representation for a corresponding acoustic frame in the sequence of acoustic frames;

generating, by an exporter network configured to receive a continuous sequence of first encoded representations generated by the base encoder, a second encoded representation for a corresponding acoustic frame in the sequence of acoustic frames;

generating, by an exporter decoder, a probability distribution over possible logits; and determining a corresponding exporter decoder loss based on the ground-truth transcription and the probability distribution over possible logits generated by the exporter decoder at the corresponding output step; and training the exporter network based on the corresponding exporter decoder loss determined at each corresponding output step of the plurality of output steps while parameters of the base encoder are frozen.

13. The system of claim 12, wherein the operations further comprise obtaining the base encoder from a pre-trained streaming recognition model that comprises the base encoder, a prediction network, and a joint network.

14. The system of claim 12, wherein:

the base encoder comprises a first plurality of multi-head self-attention blocks; and the exporter network comprises a second plurality of multi-head self-attention blocks.

15. The system of claim 14, wherein the second plurality of multi-head self-attention blocks of the exporter network are non-causal.

16. The system of claim 14, wherein the first plurality of multi-head self-attention blocks of the base encoder and the second plurality of multi-head self-attention blocks of the exporter network comprise conformer blocks.

17. The system of claim 12, wherein:

the exporter decoder comprises a connectionist temporal classification (CTC) decoder;

the corresponding exporter decoder loss comprises a CTC loss; and the logits comprise sub-word units.

18. The system of claim 17, wherein the sub-word units comprise wordpieces, graphemes, phonemes, or triphones.

19. The system of claim 12, wherein the operations further comprise, at each corresponding output step of the plurality of output steps:

determining a modular encoded representation for a corresponding acoustic frame in the sequence of acoustic frames by extracting a top-k indices of logits from the probability distribution over possible logits generated by the exporter decoder at the corresponding output step;

re-embedding the modular encoded representation determined at the corresponding output step;

generating, by an importer network, an importer representation for a corresponding re-embedded modular encoded representation; and generating, by a speech decoder, a speech recognition hypothesis for a corresponding importer representation.

20. The system of claim 19, wherein the speech decoder comprises a recurrent neural network-transducer (RNN-T) decoder.

21. The system of claim 19, wherein the speech decoder comprises a listen-attend-spell (LAS) decoder.

22. The system of claim 21, wherein the exporter decoder comprises a recurrent neural network-transducer (RNN-T) decoder.

* * * * *